United States Patent [19]

Hayakawa

[11] Patent Number: 5,130,960
[45] Date of Patent: Jul. 14, 1992

[54] POWER SUPPLIES FOR ELECTRONIC DEVICE

[75] Inventor: Motomu Hayakawa, Suwa, Japan

[73] Assignee: Seiko Epson Corporation, Tokyo, Japan

[21] Appl. No.: 732,392

[22] Filed: Jul. 18, 1991

[30] Foreign Application Priority Data

Jul. 18, 1990 [JP] Japan .................................. 2-189690

[51] Int. Cl.$^5$ ........................... G04B 1/00; G04C 3/00
[52] U.S. Cl. .................................................... 368/204
[58] Field of Search .................... 368/64, 66, 203-205; 320/1

[56] References Cited

U.S. PATENT DOCUMENTS

| | | | |
|---|---|---|---|
| 4,270,194 | 5/1981 | Morokaua et al. | 368/73 |
| 4,286,263 | 8/1981 | Lindberg | 368/64 |
| 4,653,931 | 3/1987 | Takeda | 368/205 |
| 4,730,287 | 3/1988 | Yoshino et al. | 368/205 |
| 5,001,685 | 3/1991 | Hayakawa | 368/204 |

FOREIGN PATENT DOCUMENTS 60-203887  3/1984  Japan .
61-93978   5/1986  Japan .

Primary Examiner—Vit W. Miska
Attorney, Agent, or Firm—Blum Kaplan

[57] ABSTRACT

An electronic device, in a preferred embodiment an electronic watch, including a power generating device, a secondary power source for storing generated electric energy fed from the power generating device and serving as the power source for the electronic device, a first boosting circuit for stepping up the voltage of the secondary power source, a second boosting circuit, and a capacitor connected to the output of the first boosting circuit and charged through the output of the first boosting circuit, for stepping up the voltage of the capacitor. A voltage level converter converts a control signal based on the first boosting circuit output voltage to a control signal based on the second boosting circuit output to at least in part control the operation of the first boosting circuit. In this manner, the boosting circuits control the operation of the device such that when the voltage lever is low or the voltage level reaches a certain point the device does not shut down, but rather maintains normal operation.

13 Claims, 4 Drawing Sheets

POWER SUPPLIES FOR ELECTRONIC DEVICE

BACKGROUND OF THE INVENTION

This invention relates generally to a power supply for electronic devices, and more particularly, to an electronic timepiece with a control circuit having a power supply including a power generating device and boosting circuits.

A conventional electronic device with a power generating device is described in Japanese Laid-open Patent Publication No. 60-203887. This device steps up the voltage from a secondary power source by activating a high capacitance condenser (hereinafter "a capacitor") which stores generated electric energy, and uses the stored energy in the form of a boosting voltage to act as a power source. This arrangement assures longer operation time of the electronic device. If the capacitor voltage is designated as a primary voltage and the output voltage resulting from the boosting circuit is designated as a secondary voltage, the secondary voltage level is used as the control signal of the circuit.

However, conventional electronic devices having power generating devices of the prior art have technical problem due to the switching transistors employed in the boosting circuit. When MOSFET type switching transistors are employed, current drawn by them is expressed by the following equations:

In the saturation region, $$I_d = \beta(V_{GS} - V_{TH})^2/2 \qquad \text{Equation 1}$$

In the non-saturation region, $$I_d = \beta\{(V_{GS} - V_{TH})V_{DS} - 2V_{DS}^2\}/2 \qquad \text{Equation 2}$$

When the capacitor voltage reaches a certain voltage level region or when the boosting voltage is low, $V_{GS}$ is smaller than $V_{TH}$ in the above equations. Therefore, the transistors fail to conduct and the voltage boosting operation is shut down. A shut down of the voltage boosting operation is detrimental to the electronic device, especially in the case when the electronic device employs a capacitor charged by the boosting voltage as the main source of power. When this state occurs, the electronic device entirely shuts down.

Accordingly, it is desirable to provide an electronic device with a reliable operation of the boosting circuit to prevent the electronic device from shutting down when the capacitor voltage reaches a certain voltage level region or when the boosting voltage is low.

SUMMARY OF THE INVENTION

Generally speaking, in accordance with the invention, an electronic device and more particularly an electronic timepiece with a control circuit having a power supply circuit including a power generating device is provided. The electronic device includes a generator for generating an alternating current. A secondary power supply is provided for storing the generated electric power fed from the generating device. A first boosting circuit is included for stepping up the voltage of the secondary power supply within the system. A capacitor is provided for storing electric power from said first boosting circuit. A second boosting circuit for stepping up the voltage from the capacitor is provided and the capacitor is used as the power source for the electronic device. Finally, a voltage level convertor is provided for converting a control signal at the voltage of the first boosting circuit to the output level of the second boosting circuit for application to the first boosting circuit.

Accordingly, it is an object of the invention to provide an electronic device having a reliably operating boosting circuit to prevent the electronic device from shutting down when the capacitor voltage reaches a certain voltage level region.

It is another object of the invention to provide an improved electronic device which prevents the electronic device from shutting down when the boosting voltage is low.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
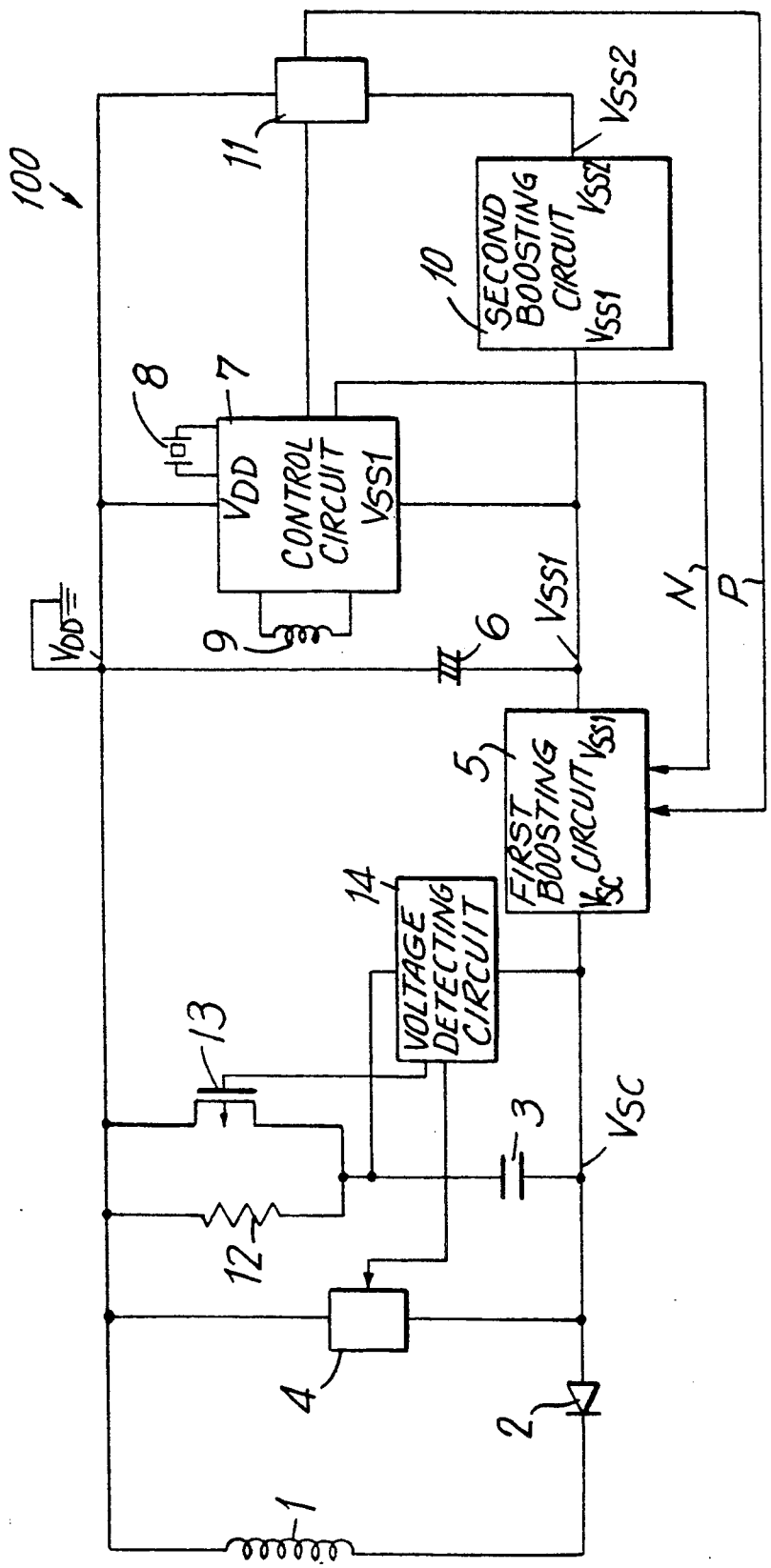
FIG. 1 is a block and circuit diagram of an electronic device in accordance with the invention.

FIG. 1 illustrates a general circuit 100 of a generating electronic device (i.e. electronic wristwatch) which includes a generator coil 1 across an a.c. voltage induced by a generating device as disclosed in Japanese Unexamined Patent Publication 61-093978. A rectifier diode 2 subjects the a.c. induced voltage to half-wave rectification and charges a high capacitance capacitor 3 with the rectified power to charge it. A limiter 4 (e.g., a transistor) acting as a switching device prevents overcharging of capacitor 3 and is activated when the voltage of capacitor 3 (hereinafter defined as $V_{SC}$) reaches a predetermined voltage level. At the same time, limiter 4 is used to bypass power generated in generator coil 1.

A first boosting circuit 5 steps up $V_{SC}$ and charges an auxiliary capacitor 6. A control circuit 7 is driven by the voltage auxiliary capacitor 6. A voltage $V_{SS1}$ is the main source of power for the electronic wristwatch. A crystal oscillator 8 serves as the source of time standard for the electronic wristwatch, which oscillates at a frequency of 32,768 Hz. A coil 9 serves as a stepping motor which is linked to wristwatch hands to show time.

A second boosting circuit 10, applying a known chargeup technique with a capacitor, further steps up the main supply $V_{SS1}$ to reach a voltage level defined by $V_{SS2}$. A level shifter 11 acting as a voltage detector, converts a control signal from control circuit 7 based on the $V_{SS1}$ voltage level into a $V_{SS2}$ voltage P based on the control signal. Converted signal P is fed to first boosting circuit 5. Control signal N outputted from control circuit 7, with no conversion added to the voltage level of $V_{SS1}$, is also fed to first boosting circuit 5. By applying the a.c. voltage drop across an immediate starter resistor 12 at the start of operation of the wristwatch, oscillation of the wristwatch is activated. A transistor 13, which remains normally on except at the start of operation, is used to control the connection of immediate starter resistor 12, rather than as a connection to the chargeup circuit.

A voltage detector 14 controls the on/off operation of both transistor 13 and limiter 4. Voltage detector 14 compares predetermined threshold voltages of voltage detector 14 with voltage level $V_{SC}$ of capacitor 3. There are two predetermined threshold voltages, one is $V_{ON}$ and the other $V_{LIM}$. When $V_{SC}<V_{ON}$ transistor 13 is set to off. The operation of the wristwatch is then started by activating immediate starter resistor 12. When $V_{SC}>V_{ON}$, transistor 13 is set to "on", assuming a high voltage region. $V_{LIM}$ is preset to a voltage level approaching the maximum voltage rating of capacitor 3. In this manner, the moment $V_{SC}$ is greater than $V_{LIM}$, limiter 4 is activated to protect capacitor 3 against overcharge.

Figure 2:
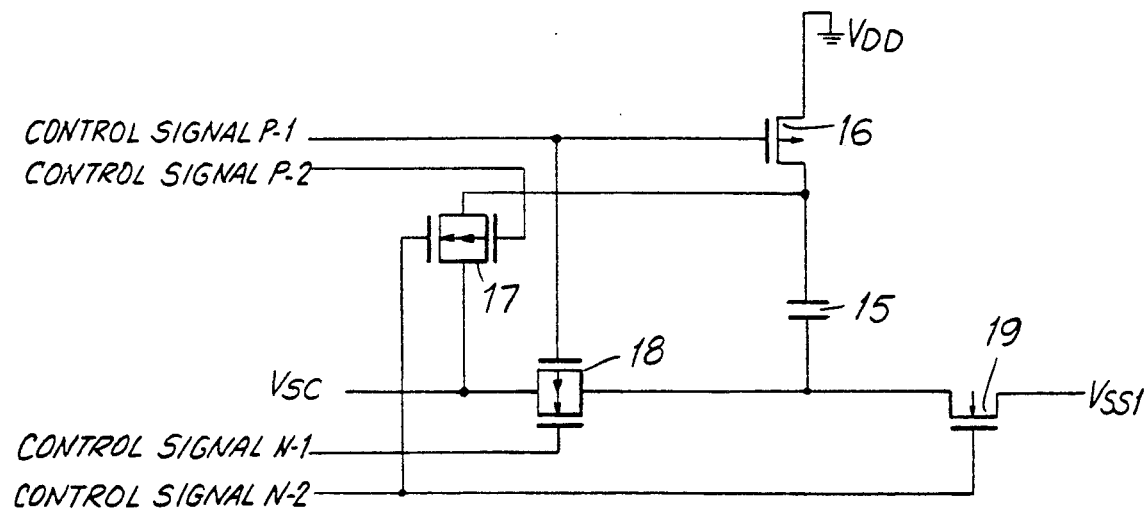
FIG. 2 is a schematic diagram of the first boosting circuit of FIG. 1.
Figures 3A, 3B:
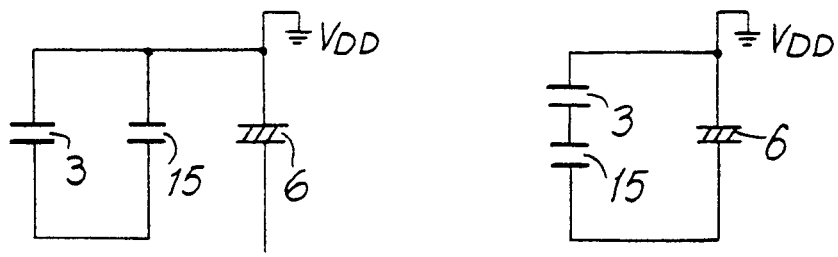
FIG. 3a and 3b are schematic diagrams showing the operation of the first boosting circuit of FIG. 2.
Figure 4:
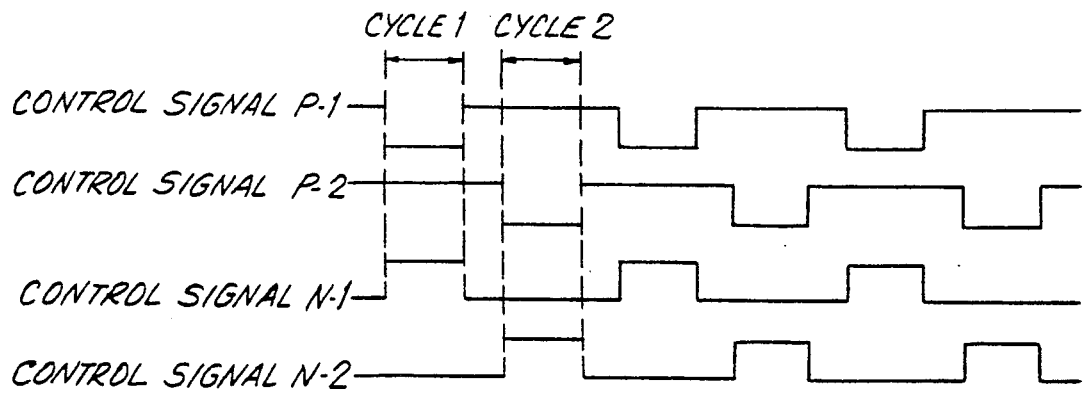
FIG. 4 is a timing chart of the first boosting circuit of FIG. 2.

Reference is now made to FIG. 2 which discloses a schematic diagram of first boosting circuit 5. A capacitor 15 is used to supply charge stored in auxiliary capacitor 3. At the timings of different clock pulses, the charging operation is performed by alternating between two different connections in the arrangement of MOSFETS 16, 17, 18 and 19. FIGS. 3a and 3b are functional representations of the two connections in their alternating state (cycles 1 and 2 respectively). The chargeup technique is known in the prior art. In this configuration, during a cycle 1 and a cycle 2, the capacitor voltage $V_{SC}$ causes the voltage of auxiliary capacitor 6 to equal $V_{SS1}$. Referring to FIG. 4, a timing chart of control signals P-1, P-2, N-1, and N-2 used to control the on/off operation of MOSFETs 16, 17, 18 and 19 of FIG. 2 is shown. During cycle of FIG. 3, both P-1 and N-1 are operational and thereby activate MOSFETs 16 and 18. During cycle 2 of FIG. 3, both P-2 and N-2 are operational and thereby activate MOSFETs 17 and 19. This switching allows the two connections to alternate and cause the voltage across capacitor 6 to equal $V_{SS1}$.

Figure 5:
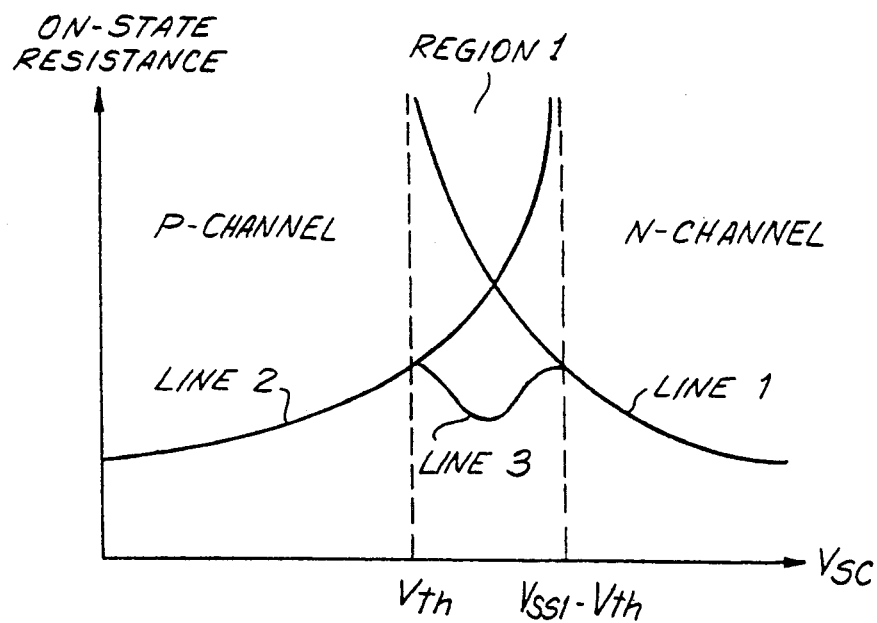
FIG. 5 illustrates the on-state resistance characteristics of the switching transistors forming the first boosting circuit of FIG. 2.

In conventional electronic wristwatches, both control signals P-1 and P-2 are directly used without conversion from $V_{SS1}$ voltage level to $V_{SS2}$ voltage level as mentioned above. The following drawbacks of the prior art thus arises due to the fact that both control signals P-1 and P-2 are used. In FIG. 5, the horizontal axis represents voltage $V_{SC}$ of capacitor 3 and the vertical axis represents on-state resistance of MOSFET 18. MOSFET 18 equally employs both the P channel and the N channel so that the N channel is in the high voltage region of $V_{SC}$ and the P channel is on in the low voltage region of $V_{SC}$.

In this manner, the gate voltage in the N channel equals the $V_{DD}$ voltage level in cycle 1 during N-1 control signal as shown in FIG. 4. Therefore, the source voltage is $V_{SC}$, and the voltage $V_{GS}$ (the voltage difference between the gate voltage and the source voltage) is equal to $V_{SC}$. Accordingly, if $V_{SC}$ is greater than $V_{TH}$ of the N channel MOSFET, current $I_d$ flows causing the N channel to be "on" as suggested by Equation 1 set forth in the Background of the Invention. Line of FIG. 5 represents on-state resistance characteristic of the single N channel MOSFET. The N channel of the MOSFET is "on" in the region when $V_{SC}>V_{TH}$.

The gate voltage in the P channel becomes a voltage value at P-1. Thus, during the cycle 1 of the P-1 control signal shown in FIG. 4, the source voltage is $V_{SC}$, and $V_{GS}$ equals $V_{SS1}-V_{SC}$ which is greater than $V_{TH}$ of the P channel MOSFET ($V_{GS}=(V_{SS1}-V_{SC})>V_{TH}$). Thus, the P channel is turned "on". Line 2 represents on-state resistance of the single P channel MOSFET, indicating that the P channel is "on" when $V_{SS1}-V_{SC}>V_{TH}$, thus, $V_{SC}<V_{SS1}-V_{TH}$.

Figure 6:
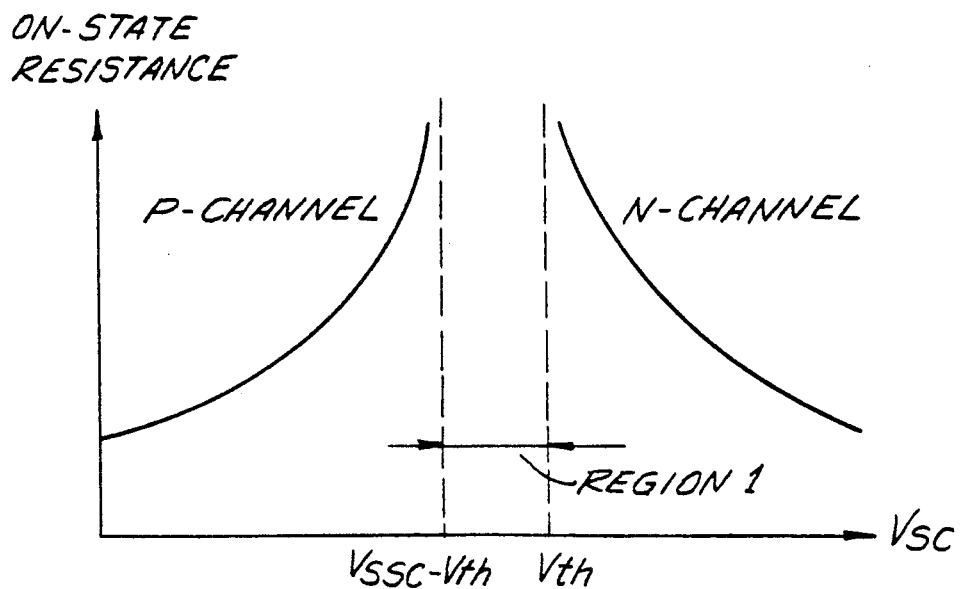
FIG. 6 illustrates the on-state resistance characteristics of the switching transistors forming the first boosting circuit of FIG. 2 wherein the voltage $V_{TH}$ reaches a high voltage region.

Line S in FIG. 5 represents the composite on-state resistance of the single P channel MOSFET and the single N channel MOSFET of the prior art. It shows that the boosting circuit functions without the on-state resistance to increase to infinity over the entire range of $V_{SC}$. However, such a switching device arrangement presents two problems. First, the current $I_d$ is dependent on $V_{TH}$. Accordingly, if a higher $V_{TH}$ is obtained as a result of variations in the amount of sputtered ions during the manufacturing process of the integrated circuits (hereinafter IC), current $I_d$ can flow very little as suggested by Equation 1. If this occurs, the boosting circuit is inoperative. A detriment to the circuit occurs due to the fact that the system operates from the boosting voltage as the main source of power supply. If a comparison is made between $V_{TH}$ in FIG. 5 and FIG. 6, a high $V_{TH}$ is shown in FIG. 6 where $I_d$ cannot flow in region 1 with the resistance increasing to infinity. In region 1 where $V_{TH}$ is high, ($V_{SC}-V_{TH}$) of the N channel MOSFET is a negative value, and ($V_{SS1}-V_{SC}-V_{TH}$) of the P channel MOSFET is a negative value as well. Accordingly, this means that both channels are unable to compensate for one another.

The second problem with the prior art is based on the fact that the entire system operates from voltage level $V_{SS1}$. Therefore, if $V_{SS1}$ voltage begins to fall instantaneously due to the motor drive pulse output, the voltage represented by ($V_{SS1}-V_{SC}-V_{TH}$) is turned from a positive value to a negative value causing region 1 to expand and thus leading to the shutdown of the step up operation.

Figure 7:
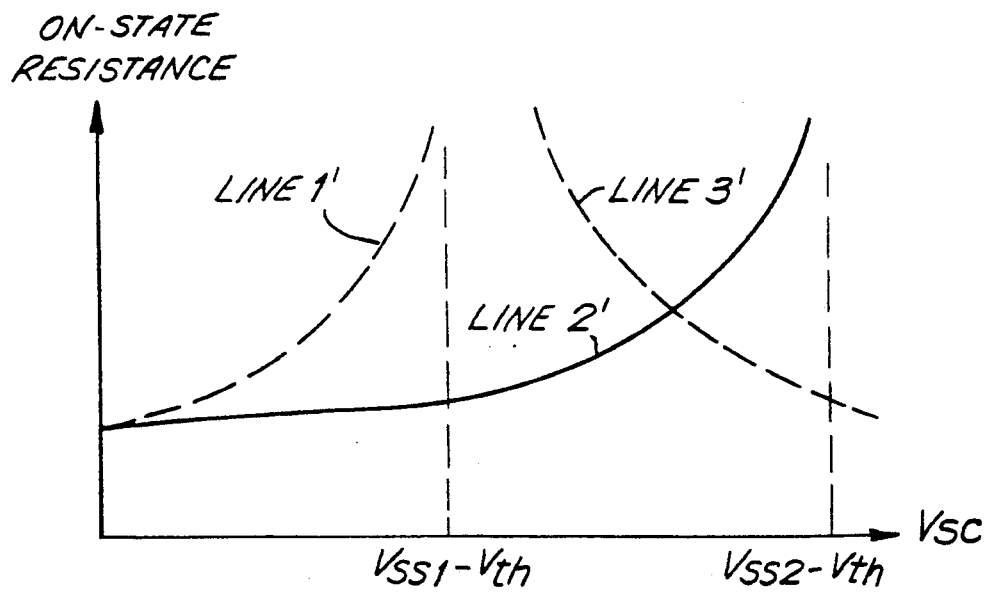
FIG. 7 illustrates the on-state resistance characteristics of the switching transistors forming the first boosting circuit of the invention.
Figure 6:
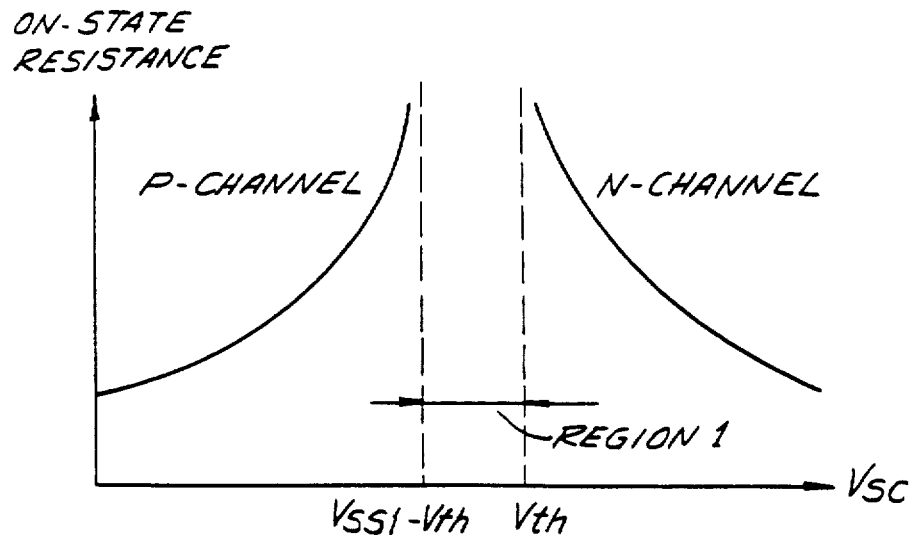

To overcome the problems of the prior art, the invention converts both P-1 and P-2 control signals, as gate control signals for the P channel MOSFET into the voltage level $V_{SS2}$. $V_{GS}$ of the P channel MOSFET is thus $V_{SS2}-V_{SC}$. $V_{SS2}-V_{SC}-V_{TH}$, in Equation 1, can be kept positive, because $V_{SS2}$ increases and reaches a voltage level twice that of $V_{SS1}$ by means of second stepup circuit 10 in FIG. 1 and as illustrated in the graph of FIG. 7. In a conventional device, dashed line 1' represents when the MOSFET is controlled by $V_{SS1}$ voltage level. In that embodiment, the resistance increases to infinity at the threshold line of $V_{SS1}-V_{TH}$. In contrast, line' of the invention depicted in FIG. 7 represents an improved case where switching is controlled by the $V_{SS2}$ voltage level. Since the threshold line is shifted to $V_{SS2}-V_{TH}$ into the higher voltage region, the composite resistance including the resistance of the N channel MOSFET is prevented from increasing to infinity (dashed line 3' showing the N channel approaching infinity in accordance with the use of a single boosting circuit).

The above description applies to MOSFET 17 as well as to MOSFET 18. $V_{GS}$ becomes $V_{SS2} - V_{TH}$ when gate control signal P-2 of the P channel MOSFET is converted into $V_{SS2}$ voltage level and $V_{GS}$ of the N channel MOSFET becomes $V_{TH}$. The present invention provides improvement in the same manner to MOSFET 18. By stepping up the gate control signals once before they are fed to the switching MOSFETs of the boosting circuit, reliable operation is assured over the entire voltage range of the capacitors. In this system, the electronic wristwatch operates from the supply voltage stepped up by the step up network, and thus a substantial advantage is provided.

Accordingly, the invention includes a power generating device, a secondary power source for storing generated electric energy fed from the power generating device, and a first boosting circuit for stepping up the voltage of the secondary power source. Further, a second step up circuit is provided. The second step up circuit includes a capacitor connected to the output of the first circuit and charged through the output of the first boosting circuit. This arrangement is provided for stepping up the voltage of the capacitor in the electronic equipment which uses the capacitor as its power source. Finally, a voltage level converter is provided. The voltage level converter converts the control signal from the first boosting circuit into the output voltage level of the second boosting circuit. In this manner, reliable operation of the boosting operation is assured over the entire voltage range of the capacitors.

In systems where electronic equipment operates from the supply voltage stepped up by boosting circuits, the shutdown of stepped up operation can thus be prevented, thereby avoiding detrimental effect to the electronic equipment. Since the present invention shifts the threshold voltage of the P channel MOSFET of the step up circuit from $V_{SS1} - V_{TH}$ to $V_{SS2} - V_{TH}$, the specification requirements of $V_{TH}$ may be less demanding during the IC manufacturing process. Accordingly, a higher yield rate and lower cost may be attained in the production of the ICs. In addition, since the invention is designed such that there are fewer instantaneous voltage drops in the boosting voltage, a wider tolerance range is attained in the capacitance specifications of auxiliary capacitor 6. Since auxiliary capacitor 6 is used to charge $V_{SS1}$, low cost and small space design requirements are satisfied.

Accordingly, the electronic device disclosed herein includes a power generating device and a secondary power source for storing generated electric energy fed from the power generating device. Further, a first boosting circuit is provided for stepping up the voltage of the secondary power source. A second boosting circuit, having a capacitor connected to the output of the first boosting circuit and charged through the output of the first boosting circuit, is included for stepping up the voltage of the capacitor. Therefore, when an electronic device uses the capacitor as its power source, a voltage level converter converts the control signal from the first boosting circuit into the output voltage level of the second boosting circuit to power the device.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A power supply for an electronic device comprising:
    power generating means for generating a power source;
    secondary power supply means for storing generated electric power fed from said power generating means;
    first boosting circuit means for stepping up the voltage of said secondary power supply means;
    capacitance means coupled to the output of said first boosting circuit means for storing electric power;
    second boosting circuit means for stepping up the voltage in said capacitance means, said capacitance means being used as a power source for the electronic device; and
    voltage level converter means for converting a control signal substantially at the voltage level of said first boosting circuit means into a control signal substantially at the output voltage of said second boosting circuit means for application to and control of said first boosting circuit means.

2. The electronic device of claim 1, wherein said electronic means comprises timekeeping means for maintaining time; said capacitance means providing power to said timekeeping means.

3. The electronic device of claim 1, wherein said electronic device is a wristwatch.

4. The electronic device of claim 1, wherein said first boosting circuit means is coupled between said secondary power supply means and said capacitance means.

5. The electronic device of claim 1, wherein said second boosting circuit means is coupled between said first boosting circuit means and said voltage level converter means.

6. The electronic device of claim 1, wherein said secondary power supply means comprises a second capacitance means.

7. The electronic device of claim 6, wherein said power generating means is an AC power generating means and including diode means coupled intermediate said power generating means and said second capacitance means.

8. The electronic device of claim 6, and including limiter means including voltage detecting circuit means for detecting the voltage across said secondary power supply means, said limiter means being adapted to prevent the voltage across said secondary power supply means from exceeding a first pre-determined level and response to said voltage detecting circuit means.

9. The electronic device of claim 8, and including immediate starter resistor means coupled in series with said secondary power supply means, and control means coupled to said voltage detecting circuit means and to said immediate starter resistor means for essentially short circuiting said immediate starter resistor means when the voltage across said secondary power supply means exceeds a second pre-determined voltage.

10. The electronic device of claim 8, wherein said first pre-determined voltage is larger than said second pre-determined voltage.

11. The electronic device of claim 6, wherein said electronic device includes control circuit means for producing control signals, control signal means applying an intermediate control signal substantially at the voltage level of the output of the first boosting circuit means to said voltage level convertor means for producing a first control signal substantially at the voltage level of the output of said second boosting circuit means for application to said first boosting circuit means, said control circuit means producing a second control signal substantially equal to the voltage level of the output of said first boosting circuit means.

12. The electronic device of claim 11, wherein said first and second control signals each includes a first and second control signal portion, the first and second signal portions of each of said first and second signals each being delayed relative to the other, the first and second control signal portions of the first control signal being out of phase with the corresponding first and second control signal portions of the second control signal.

13. The electronic device of claim 12, and including a first switching transistor means gated by the first signal portion of said first control signal and coupled with its source-drain path in series with said capacitance means, a second switching transistor means gated by the second control signal portions of said first and second control signals, a third transistor switching means gated by the first signal portions of said first and second control signals, said second and third transistor switching means both selectively coupling the output voltage of said first boosting circuit means to said capacitance means and a fourth transistor switching means gated by said second control signal portion of said second control signal means and having its source-drain path coupled intermediate said capacitance means and the output of said power generating means.

* * * * *

UNITED STATES PATENT AND TRADEMARK OFFICE
CERTIFICATE OF CORRECTION

PATENT NO. : 5,130,960
DATED : July 14, 1992
INVENTOR(S) : Motomu Hayakawa

It is certified that error appears in the above-indentified patent and that said Letters Patent is hereby corrected as shown below:

Figure 6, should be deleted to appear as per attached fig. 6.

Signed and Sealed this

Nineteenth Day of October, 1993

BRUCE LEHMAN

Attest:

Attesting Officer

Commissioner of Patents and Trademarks